US 9,582,210 B2

(12) United States Patent
Taylor (10) Patent No.: US 9,582,210 B2
(45) Date of Patent: *Feb. 28, 2017

(54) OBJECT CLASSIFICATION AND IDENTIFICATION FROM RAW DATA

(71) Applicant: EMC IP Holding Company LLC, Hopkinton, MA (US)

(72) Inventor: Kenneth J. Taylor, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,671

(22) Filed: Jun. 24, 2015

(65) Prior Publication Data

US 2016/0026404 A1    Jan. 28, 2016

Related U.S. Application Data (63) Continuation of application No. 13/873,518, filed on Apr. 30, 2013, now Pat. No. 9,092,159.

(51) Int. Cl.
    *G06F 3/06*    (2006.01)
(52) U.S. Cl.
    CPC .......... *G06F 3/0622* (2013.01); *G06F 3/061* (2013.01); *G06F 3/0631* (2013.01); *G06F 3/0653* (2013.01); *G06F 3/0683* (2013.01); *G06F 3/0685* (2013.01); *G06F 3/06* (2013.01); *G06F 3/0614* (2013.01); *G06F 2101/14* (2013.01)
(58) Field of Classification Search
    CPC ....... G06F 2101/14; G06F 3/06; G06F 3/0685
    See application file for complete search history.

(56) References Cited

U.S. PATENT DOCUMENTS

| 6,418,445 | B1 * | 7/2002 | Moerbeek | G06F 11/3006 |
| 7,613,881 | B2 * | 11/2009 | Illowsky | G06F 1/3203 711/117 |
| 8,046,477 | B1 * | 10/2011 | Arutla | G06F 3/06 709/220 |
| 8,566,483 | B1 * | 10/2013 | Chen | G06F 3/0605 710/18 |
| 8,566,549 | B1 * | 10/2013 | Burke | G06F 3/0611 711/114 |
| 8,688,878 | B1 * | 4/2014 | Dolan | G06F 3/061 710/33 |
| 8,788,788 | B2 * | 7/2014 | Colgrove | G06F 3/0608 711/117 |
| 8,838,887 | B1 * | 9/2014 | Burke | G06F 3/0611 711/112 |
| 8,838,931 | B1 * | 9/2014 | Marshak | G06F 3/0605 710/74 |
| 8,868,797 | B1 * | 10/2014 | Kirac | G06F 3/061 710/15 |
| 8,904,146 | B1 * | 12/2014 | Lazar | G06F 12/0223 711/117 |

(Continued)

*Primary Examiner* — Jared Rutz
*Assistant Examiner* — Khoa D Doan
(74) *Attorney, Agent, or Firm* — Van Pelt, Yi & James LLP (57) ABSTRACT

Raw data is accessed from a storage device. A sample survey technique is used on the raw data to select a sample data. A data science technique is used on the sample data to determine a sample data category. The raw data is classified at least in part by considering the sample data category. A tier of storage is identified for the raw data on the storage device based on the classification.

17 Claims, 6 Drawing Sheets

(56) References Cited

U.S. PATENT DOCUMENTS

| | | | |
|---|---|---|---|
| 2007/0185934 A1* | 8/2007 | Cannon | G06F 11/1451 |
| 2009/0019065 A1* | 1/2009 | Sapounas | G06F 17/30539 |
| 2009/0204746 A1* | 8/2009 | Chen | G06F 12/0246 |
| | | | 711/103 |
| 2010/0153634 A1* | 6/2010 | Fellinger | G06F 3/0611 |
| | | | 711/104 |
| 2011/0197027 A1* | 8/2011 | Balasubramanian | G06F 3/061 |
| | | | 711/117 |
| 2011/0197046 A1* | 8/2011 | Chiu | G06F 3/0617 |
| | | | 711/171 |
| 2011/0289287 A1* | 11/2011 | Yamamoto | G06F 3/0605 |
| | | | 711/156 |
| 2012/0166749 A1* | 6/2012 | Eleftheriou | G06F 3/0616 |
| | | | 711/165 |
| 2012/0198152 A1* | 8/2012 | Terry | G06F 11/1092 |
| | | | 711/114 |
| 2012/0303929 A1* | 11/2012 | Chiu | G06F 17/30091 |
| | | | 711/173 |
| 2013/0124780 A1* | 5/2013 | Baderdinni | G06F 3/061 |
| | | | 711/103 |
| 2013/0297873 A1* | 11/2013 | Hyde, II | G06F 3/0611 |
| | | | 711/117 |
| 2014/0122800 A1* | 5/2014 | Williams | G05B 23/0221 |
| | | | 711/117 |
| 2014/0324920 A1* | 10/2014 | Hamilton | G06F 17/30592 |
| | | | 707/812 |
| 2014/0325149 A1* | 10/2014 | Misra | G06F 3/0619 |
| | | | 711/114 |

* cited by examiner

OBJECT CLASSIFICATION AND IDENTIFICATION FROM RAW DATA

CROSS REFERENCE TO OTHER APPLICATIONS

This application is a continuation of co-pending U.S. patent application Ser. No. 13/873,518 entitled OBJECT CLASSIFICATION AND IDENTIFICATION FROM RAW DATA filed Apr. 30, 2013 which is incorporated herein by reference for all purposes.

BACKGROUND OF THE INVENTION

The computer data storage industry was expected to ship more than five exabytes of storage in 2012. A common interest is improving data storage performance and/or cost. It would be useful to improve performance and/or cost for as much data as possible.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Performance and/or cost of data storage can be improved by understanding the content that a user, through an application, stores. One example to improving performance and/or cost includes tiering data storage that recognizes storage media differ in several aspects including price, latency, throughput, availability, reliability, and/or geographic locale. If a storage system understood that certain data was a movie rarely accessed, it could tier that content lower than another data that was a database that may be accessed often.

Applications may have challenges in communicating that content/object identification to a storage system. For example, in some embodiments a Hints Application Programmers Interface ("API") may be provided by tiering software to an application's developers to give "hints" to the tiering software about object classification, importance, and other important information. Throughout this specification "tiering software" may be generalized without limitation to computer software or hardware dedicated to placing or moving content to tiers with different performance and value. In some embodiments the storage system developer and an application may be from the same organization; for example, a database classifier software may provide hints about certain enterprise database objects via the Hints API. This database classifier runs as host software in the database domain, and thus has information that it can provide to the storage system about important objects. If they are from the same organization, they can continue to make iterative changes to the kind of hinting information that is passed to test the utility for the tiering software with regards to hinting information received.

However, more generally the problem remains. It may be difficult it is to work with a vast ecosystem of partners to obtain all of the desired/required knowledge about objects. Some of the historical problems can be categorized as one or more of the following:

Lack of clarity on what hints to ask for; a storage system developer requires engaged application development partners to do a lot of testing on which hints are most effective;

Application development partners may not have a compelling business reason to be providing information to storage system developers;

It may be difficult to establish normative hints between many different application development partners;

The velocity of change between application versions and interrelations between applications may be too great to be working explicitly with comparatively slow partner cycles; and There may simply be too many discrete partners to work with.

By contrast, unilaterally and algorithmically inspecting the content of the data, to provide services/capabilities such as improved performance/cost, specialized searches in cloud infrastructures, object identification/policy management, advanced security and compliance features is disclosed. One such capability would be the ability to independently determine object classification and then provide this information to data management applications such as tiering software, which would be able to set policies that would be beneficial to a customer's overall performance/cost and capacity management goals. The term "unilateral" here refers to the storage system itself performing the inspection rather than relying on one or more application developers.

With regards to specialized searches in cloud infrastructures, search algorithms may depend upon access to information via standard JO infrastructure mechanisms. That is, the data must be accessible on a host computer, via host operating system device access software standards, host virtualization layers, logical volume managers, filesystems, and combinations therein. However, due to snapping, cloning and vaulting technologies, much data may not be accessible by normal host processes. This data is often not mounted to a host, and as such is not searchable or inspectable by normal host processes. In some cases, this amount of information far exceeds the amount of information that is exposed to typical host processors. An advantage of algorithmic inspection is that it is unconcerned with whether the data resource is mounted to a typical use host. Thus it can perform inspection on snaps, clones and vaulted data just the same as data that is mounted to active hosts.

For this reason, algorithmic inspection is able to perform specialized searches for highly secure N-Grams or data with unique statistical signatures that inspection has been instructed and/or trained to find, across all data under control, whether exposed to hosts or not. Host software may not be able to do this. Another advantage is that attempts at obfuscation, such as renaming files, may be caught as well, since algorithmic inspection looks at the internals of the object, rather than metadata such as filenames.

Furthermore, a technique to classify large ranges of objects is disclosed. While small ranges of objects may be less interesting to tiering software, larger objects and object farms may be acted upon effectively by tiering software. Classification routines run on computers, for example in some embodiments may run as an EMC VMAX V'ger application running SAS ("Statistical Analysis System"), R, and/or MADlib with Community Edition EMC Greenplum code, or any combination on Linux. Although the initial object classification target using these methods is for classification of larger ranges of objects, some techniques may be appropriate for individual object identification in certain instances.

Figure 1:
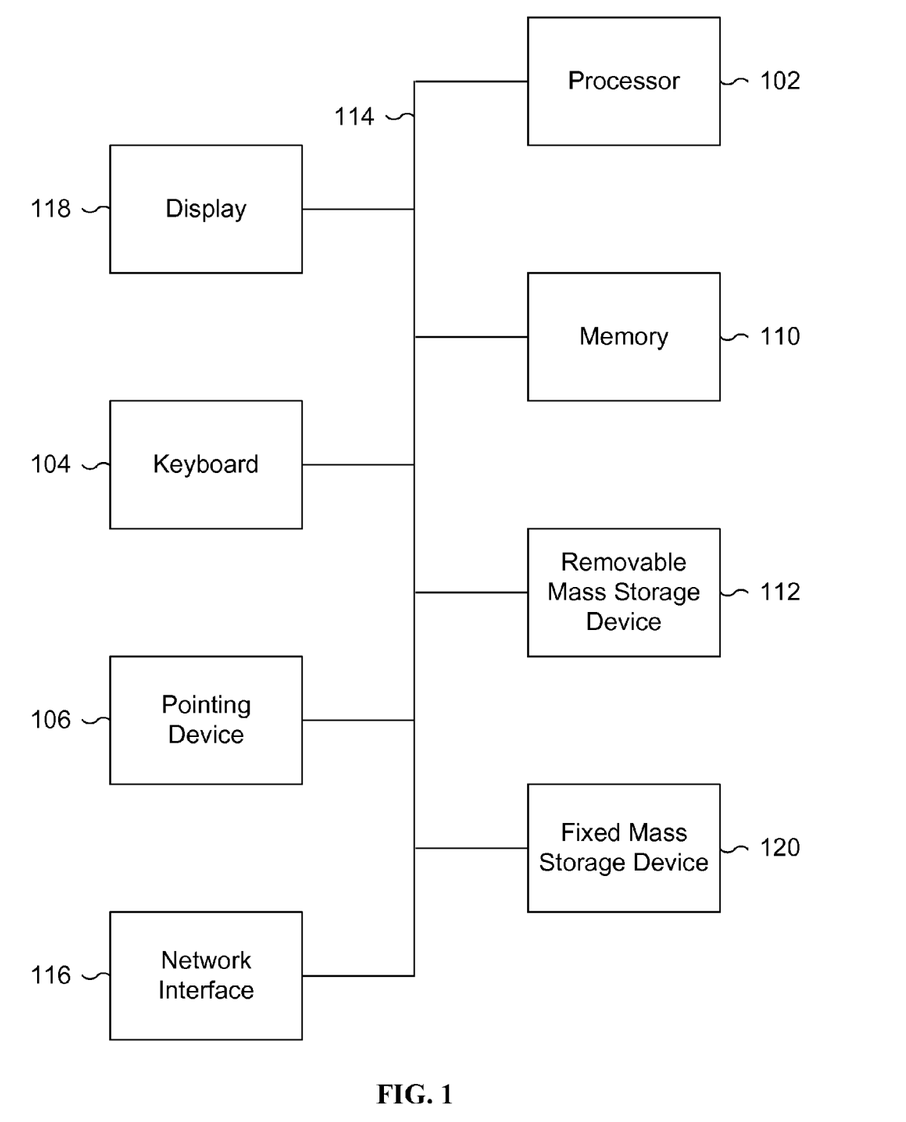
FIG. 1 is a functional diagram illustrating a programmed computer system for distributed workflows in accordance with some embodiments.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The block processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, Peripherals Connections Interface ("PCI"), PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
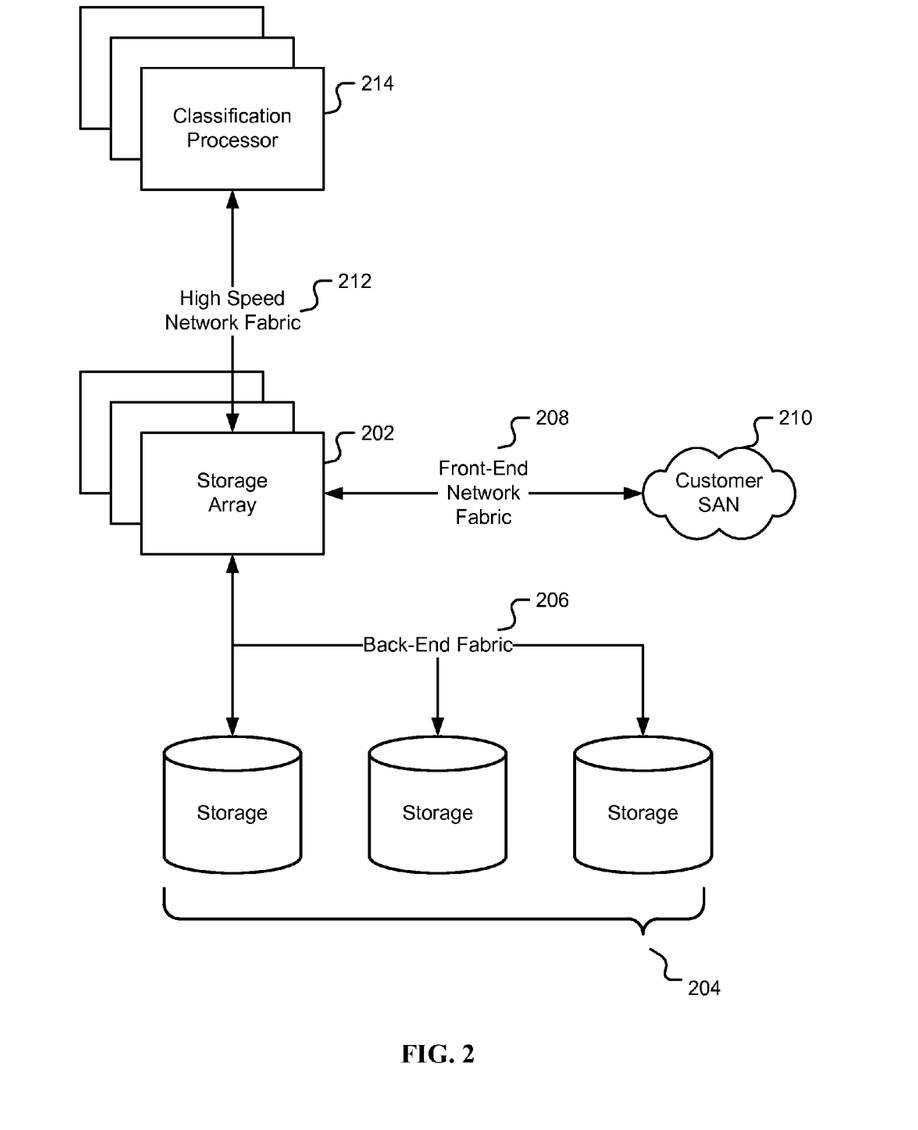
FIG. 2 is a block diagram illustrating an embodiment of a system for object classification and identification from raw data.

FIG. 2 is a block diagram illustrating an embodiment of a system for object classification and identification from raw data. Storage array 202 is coupled to one or more storage devices 204 via back-end fabric 206. Storage array 202 is also coupled via front-end fabric 208 to customer Storage Area Network ("SAN") 210, which includes one or more user/applications. Throughout this specification an "array" may refer to one or more computer servers.

In some embodiments, storage array 202 is coupled via a high speed network fabric 212 to a classification processor(s) 214. Classification processor 214 includes one or more compute servers. for example EMC VMAX VGER nodes, that run one or more of the following: SAS,R, MADlib with EMC Greenplum, Hadoop, Mapreduce, VMWare Serengeti, and/or other proprietary or open licensed sampling and/or data science software. An example of a high speed network fabric 212 is an Infiniband fabric. In some embodiments, classification processor 214 is integrated within storage array 202 (not shown in FIG. 2).

In some embodiments, storage array 202 is symmetric, for example EMC Symmetrix VMAX arrays. Examples of a storage device 204 include one or more of the following: hard disk drives (including PATA, SCSI, Serial-Attached SCSI, SATA, Fibre Channel ("FC"), 7.2 k rpm spindle speed drives, 10 k rpm spindle speed drives drives, 15 k rpm spindle speed drives drives), tape drives, flash memory, solid state drives ("SSD"), cloud storage systems, PC cards, portable mass storage devices, holographic storage devices, optical storage, offline storage, nearline storage, online storage, and other storage devices. Throughout this specification, the term "LUN" (Logical Unit Number) is a reference to a logical drive on storage device 204. An example of a back-end fabric 206 is an Infiniband fabric.

An example of a front-end fabric 208 is a FC fabric. An example of an application running on a customer SAN 210 includes a database application that uses, for example an Oracle database.

Figure 3:
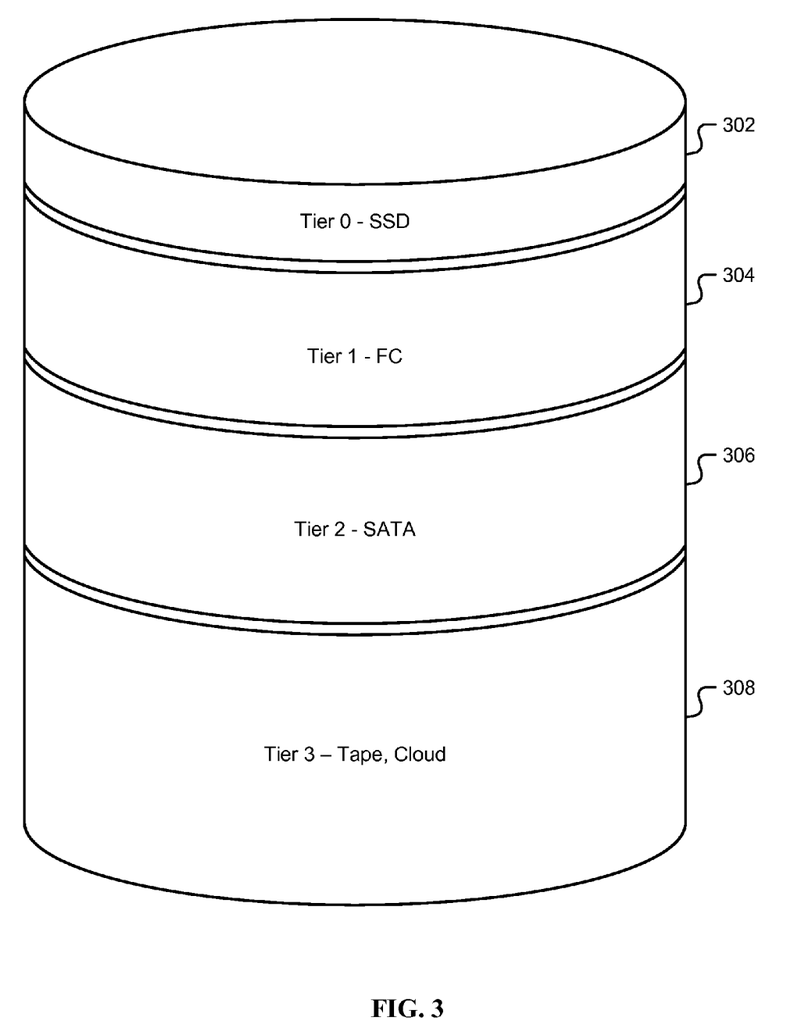
FIG. 3 is an illustration of an embodiment of data storage tiering.

FIG. 3 is an illustration of an embodiment of data storage tiering. In some embodiments, the storage device 204 of FIG. 2 may be one of the devices shown in FIG. 3, or a hybrid device incorporating two or more of the devices shown in FIG. 3.

The example shown in FIG. 3 relates to physical storage devices but without limitation any person having ordinary skill in the art is generalized to include other (caching) abstractions, for example geographic localization, memory devices, communication devices, logical storage devices, and other concepts including the locality of reference.

In the example shown, each tier is shown, starting with Tier-0 (302), with progressively lower performance/cost for Tier-1 (304), Tier-2 (306), and so on. Throughout this specification "performance" may refer to any desirable customer resource/cost including one or more of the following: latency, throughput, availability, reliability, data storage price (e.g. in bytes), data transfer price (e.g. in bytes/sec), and/or geographic locale. Although four tiers are shown in the example in FIG. 3, any person having ordinary skill in the art would understand the principles described herein pertain to any tiered storage of any number of tiers.

Tier-0 (302) includes the fastest storage available to the storage array 202 and may include without limitation one or more of: processor registers, caches, SRAM, DRAM, computer bus (e.g. PCI) memory/flash cards, main memory, flash memory, and SSD. Examples of Tier-1 (304) devices are FC drives, 15 k rpm Serial-Attached SCSI drives, and 10 k rpm Serial-Attached SCSI drives. Examples of Tier-2 (306) drives include nearline Serial-Attached SCSI drives and SATA drives. Examples of Tier-3 (308) drives include tape drives and a cloud storage system.

Figure 4:
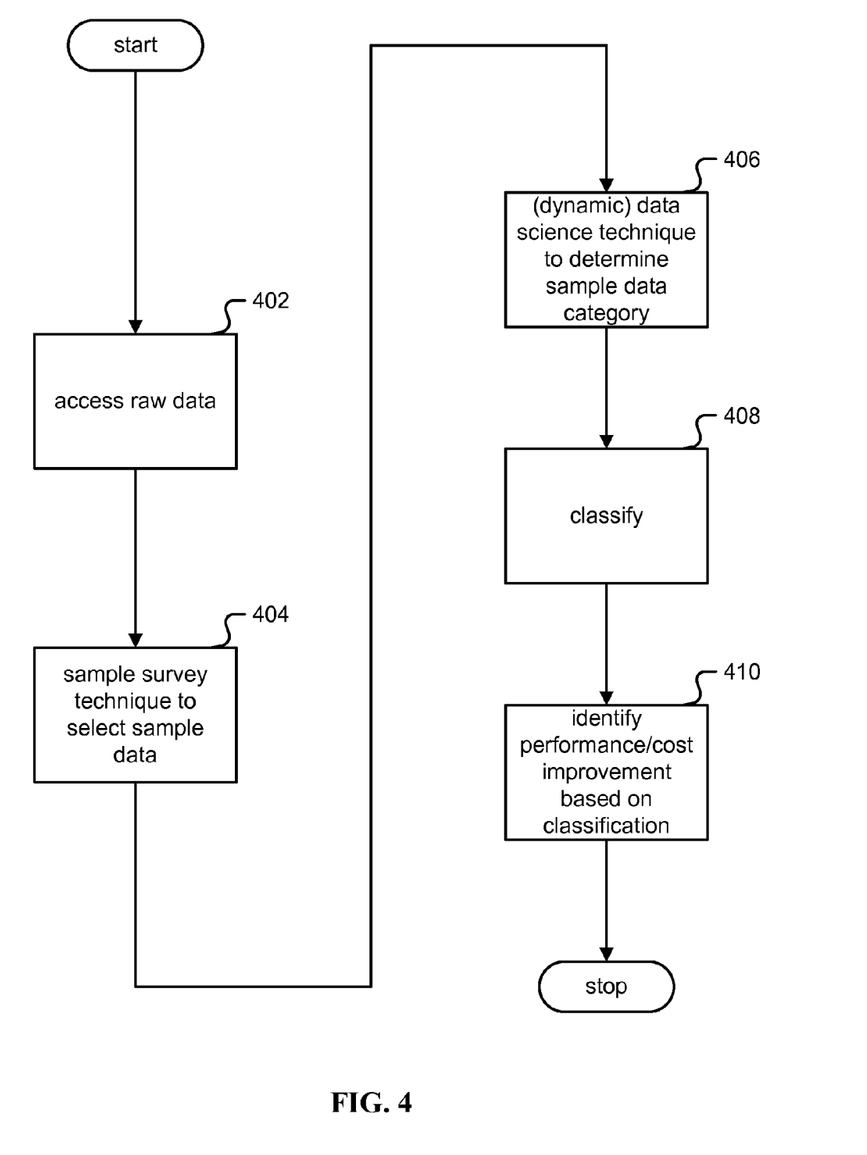
FIG. 4 is a block diagram illustrating an embodiment of object classification and identification from raw data.

FIG. 4 is a block diagram illustrating an embodiment of object classification and identification from raw data. In some embodiments, the method of FIG. 4 may be executed in classification processor 214 of FIG. 2.

In step 402, the classification processor 214 accesses raw devices/raw LUNs 204. Raw data may refer without limitation to raw binary data, raw text data, or any data at a low level, wherein low level refers to data without abstractions such as file systems, file-level systems, block-level systems, and so on. In some embodiments, VGER nodes use SAS and/or R to access raw devices and/or raw LUNs.

In step 404, a sample survey technique is used to select sample data. For example, the classification processor 214 creates sample surveys of desired statistical confidence limits for sampling "chunks" of data on raw LUNs. In some embodiments, SAS and/or R is used to read the observation chunks based on a survey plan. A chunk may refer to any amount of storage data including that specified in bits, bytes, kilobytes, megabytes, gigabytes, and so on.

In step 406, a data science technique is used to determine a sample data category. For example, the classification processor 214 predicts the object classification for the chunk of data against a trained classifier, for example micro-text analysis with naïve Bayes classification. Object classifications can include, but are not limited to one or more of the following: MP3s, MP4As, ID3, mhod, MP4, WMV, Structured Query Language ("SQL") files, Oracle files, music files, video files, photo files, database files, database logs, logs, classification project objects like Digital Corpora as detailed at www.digitalcorpora.org, and objects used in other classification projects. In some embodiments, the classification processor 214 records metadata and statistics for a cluster analysis run. A cluster analysis run is made when the statistics have been generated for each observation.

In step 408, the sample data categories are processed for classification. In some embodiments, steps 404 through 408 are iterated (not shown in FIG. 4) by classification processor 214 to perform survey iteration to determine object farm ranges. For example if the classifier 214 predicts that chunk 123, 275 and 345 are movie information, the movie farm range may include all chunks between chunks 123 through 345. In some embodiments, in this step the classifier 214 also takes note of un-classifiable ranges to save metadata that will allow for dynamic data science analysis. Dynamic data science analysis includes state change analysis, for example Laplace transform, Fourier transform, and Markov chain analysis. In some embodiments, the results of this step include machine learning to adjust the sample survey technique 404 and/or data science technique 406 based on analysis/visualization of the results of classification 408.

In step 410, the storage system in FIG. 2 identifies performance and/or cost improvements based on the classification of step 408. For example, object classification results is made available for automated consumption by storage tiering features. One example of storage tiering is that implemented by the EMC FAST (Fully Automated Storage Tiering) system.

Figure 5:
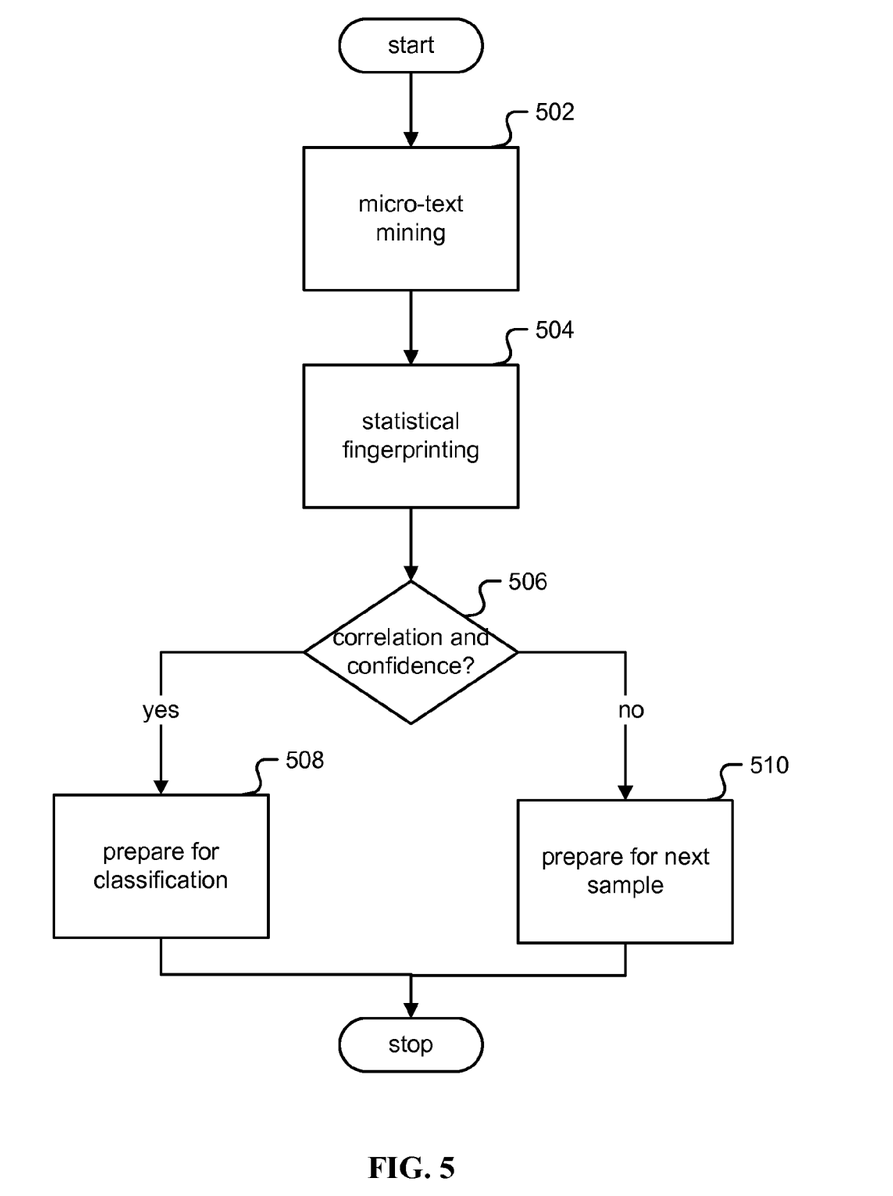
FIG. 5 is a block diagram illustrating an embodiment of data science techniques to categorize and classify.

FIG. 5 is a block diagram illustrating an embodiment of data science techniques to categorize and classify. In some embodiments, the process of FIG. 5 is included in steps 406 and/or 408 of FIG. 4.

In step 502, micro-text mining is used as a data science technique. In some embodiments, long n-gram micro-text mining is used. Micro-text mining looks for discrete characteristics of the content. For example, finding tags and/or long n-grams such as the string "MP3" within a chunk are used as identifiable text characteristics in a Naïve Bayes analysis. In some embodiments, micro-text mining is performed in either SAS and/or R. This technique assists with identification of object class, and in some cases may allow for identification of exact objects which can be identified by embedded micro text.

In step 504, statistical fingerprinting is used as a data science technique. In some embodiments, K-means clustering on 4 statistical fingerprints per sample are used. In some embodiments, an object is converted into arrays of numerical vectors, and classification processor 214 attempts to assign an observation to the nearest statistically "close" cluster. For example, the technique may without knowing anything special about the content of the data chunk, correlate that a video object may cluster closer to other video objects based purely on a mathematical representation of the information. Classification processor 214 applies iterative attempts at K-Means Clustering during this process. Examples of fingerprints include one or more of the following: a Hamming weight, an arithmetic mean, a Shannon entropy, and a Kolomogrov-Smirnov p-value statistical vectors for each observation. Classification processor 214 then performs k-clustering around those variables. In various embodiments, other statistical vectors may be used.

Example statistical fingerprints using these include:
  Arithmetic Mean. Sum of byte values (0-255) for the observation divided by observation size (32K)
  Hamming Weight. Numbers of bit-level 1's in the observation divided by total numbers of bits in the observation.
  Kolomogrov-Smirnov. p-value against object paradigm distribution. If values are >0.05, the system cannot rule out that observation comes from the same byte distribution as the sample compared against.
  Shannon Entropy. Computed using bi-grams (2 bytes at a time). Represents a measure of skew (lower entropy) or randomness (higher entropy) in the observation.

In an additional step after 504 (not shown), a dynamic data science technique may be used. Dynamic data science analysis includes state change analysis, for example Laplace transform, Fourier transform, and Markov chain analysis.

In step 506, the above two/three data science techniques are correlated and confidence is established to the classification. If there is informal and/or formal convergence towards a classification, control is transferred to step 508 to prepare the object range for classification. Otherwise, control is transferred to step 510 wherein the next sample is prepared for analysis.

Figure 6:
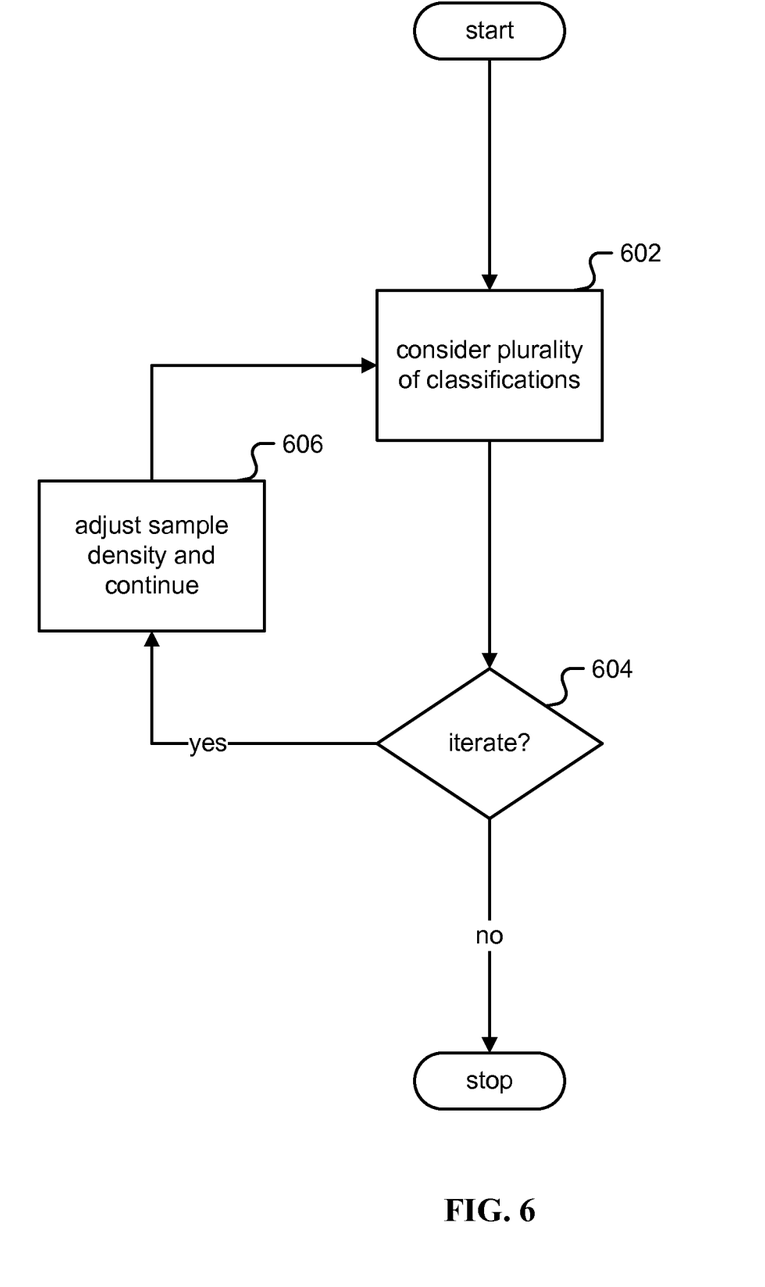
FIG. 6 is a block diagram illustrating an embodiment of survey sample iteration technique for sampling.

FIG. 6 is a block diagram illustrating an embodiment of survey sample iteration technique for sampling. In some embodiments, the process of FIG. 6 is included in steps 402 of FIG. 4.

In some embodiments, the selection of object chunks to analyze relies on sample survey techniques to select data for inspection and iteration. Sampling, as opposed to inspecting all of the at-rest data on a storage device, improves feasibility by reducing data processing resources/machine costs and improving analysis speeds on classification processor 214. A primary benefit of using sampling to is to spend as little time and/or machine cost as possible on LUNs where no object classification can be determined and/or the LUN is of little interest. Sample surveys techniques including SAS's SURVEYSELECT procedure, and/or a simple randomizer for selection of LUN slices for inspection using a simple random sampling ("SRS") based on a uniform, normal, or other distribution/frequency.

In some embodiments, a preparation phase using OS command functions (awk, dd, etc) or other code to read the observations as directed by the sample survey from the raw device LUNs. A set of observations is created to be used by the statistical package, for example R,SAS, and/or MADlib. The file of binary data is input into the procedures as detailed in steps 406-408. This methodology may be changed to other methods efficient for CPU consumption.

Any chunk sizes for micro-text mining and statistical fingerprinting as described in FIG. 5 may be used in varying embodiments. The chunk sizes for micro-text mining may be larger, smaller, or equal to those for statistical fingerprinting. These chunk sizes and sampling methods are independent and without limitation may be fine tuned based upon implementation, and degree of desired statistical accuracy.

In step 602, the classifier 214 considers a plurality of classifications. For example, when two or more samples on a LUN are estimated by the classifier 214 to have the same object classification, the classifier 214 inspects closer to see in finer detail the boundary of where that object class starts and/or stops as shown in step 604.

If it is determined to be of interest for iteration in step 604, control is transferred to step 606 and sample density (or without limitation other parameters of the sample survey technique, not shown) are adjusted and the flow continued. Otherwise, control is transferred to stop the iteration. For example, a sample survey looks at LUN chunks (1, 2, 3, 123, 275, 536, 1224, . . . , n−3, n−2, n−1, n). Classifier 214 predicts that chunk 123, 275, and 536 are database log structured information. In this case, rather than bailing on this LUN and moving on, classifier 214 may be configured to investigate more detail about the boundaries of what has been discovered. In some embodiments, a survey design is run with higher sampling percentage, and the classifier inspects estimates for the observations between a and b, wherein:

a=first observation on LUN that is not of desired object class b=last observation of LUN that is not of desired object class c=first observation on LUN that is from desired object class d=last observation on LUN that is from desired object class Adjusting sampling percentage in an iteration method yields a more granular bounding of the object class objects albeit at a greater machine cost. In some embodiments, a more sophisticated model increases the confidence, increases the chunk size and uses an adjusted classifier for prediction on the larger chunk inspection, in part to reduce machine cost.

There may be a mini/max functional relationship between the chunk size, the number of chunks sampled, and the accuracy of the system, given a range of data to inspect for identification of object farms:

Sample Survey Technique.

A sampling technique is chosen over the range. Simple random sampling with additional samples at the beginning and end of the range may be used, alternately other more sophisticated methods may be used in some embodiments. For example, a 2 MB chunk size used for N-Gram microtext inspection may be used, while a smaller chunk size for the statistical fingerprints may be used, since the large size may provide no extra significance with extra machine computation cost. As the chunk size increases, the machine cost increases. In the case of N-Grams, the accuracy increases. In the case of statistical fingerprints it does not seem to.

Range Iteration.

Once locked into a range of objects that are all one type with current sampling analysis, the system may test that hypothesis further by increasing the accuracy. Increasing the chunk size for that range and/or increasing the number of chunks in the sample are ways to do this. Sampling allows the system to stop looking at any unproductive ranges within short order.

Another example of iteration uses a Range Iteration Routine. There are several range iteration algorithms that reduce machine cost. For example, an algorithm may re-run the sample survey routine at an escalating percentage. An original sample survey may call for 1% random observations on the LUN. If observation 25, 50 and 75 were each classified as log objects, and there were no sampled objects in between, classifier 214 may initially believe that they have probably found a log object range. A Range Iteration Routine works as follows:

Step 1. Rerun the Sample Survey Routine using 5% SRS (or other selection). The flat file of observation selections may now have many more observations to classify between 25-75 as well as <25 and >75; and Step 2. Using this greater precision for the range, the algorithm may either suggest that the premise that a range was discovered is false, or give the upper and lower boundaries of the range.

Generally, the target applications of performance/cost, such as tiering, do not require, and rarely achieve 100% accuracy of object placement. If the range misses an observation or two on either end, it is generally not catastrophic, in comparison to replication or ACID (Atomicity, Consistency, Isolation, Durability) compliant types of features.

Encryption.

In some embodiments, data is encrypted. Encryption-at-rest is not a problem given where the implemented classifier 214 code/layer may execute in the computational stack in classifier 214, where data would be presented to the application as un-encrypted when read. Any raw data accessed will have been already un-encrypted just as with any other external host access.

Data that is written to the array already encrypted by, for example RSA encryption software, can be unencrypted prior to inspection. In that example, an RSA client in conjunction with an RSA key manager can get key (e.g. K1) corresponding to the client data mapping, decrypt the data using key and seed, then process on classification processor 214.

Network Traffic.

In some embodiments, additional functionality acts by analyzing network traffic to look for application fingerprints and attempt to describe which application objects have been observed being accessed on which host stack hierarchies. This sophisticated technique is only effective for data being accessed.

Key advantages of unilateral object classification and identification from raw data include unilateral control of object classification, without depending on application development partners or customers to provide classification information via a Hints API. A further advantage is the ability to extend analysis capability to data not exposed to customer hosts, including snaps, clones, unmounted LUNs, and so on.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

unilaterally accessing a raw data from a storage device;

using a sample survey technique on the raw data to select a sample data;

using the sample survey technique on an updated raw data to select an updated sample data;

using a dynamic data science technique comprising a state change analysis on the sample data and the updated sample data to determine a sample data category;

using a processor to classify the raw data at least in part by considering the sample data category;

iterating to adjust the sample survey technique based at least in part on the classification of a nearby sample data, wherein adjusting the sample survey technique includes increasing confidence and decreasing sample density of future sample surveys for a same LUN;

providing the classification to a tiering software associated with the storage device; and adjusting classification on future sample data categories for the same LUN.

2. The method of claim 1, wherein the dynamic data science technique is one or more of the following: a Laplace transform, a Fourier transform, and a Markov chain.

3. The method of claim 1, wherein the storage device is one or more of the following: a storage array, an element of the storage array, and a LUN.

4. The method of claim 1, wherein the sample survey technique uses simple random sampling.

5. The method of claim 1, wherein the sample survey technique uses data analytic software.

6. The method of claim 1, wherein the sample data category includes one or more of the following: MP3s, MP4As, ID3, mhod, MP4, WMV, SQL files, database files, music files, video files, photo files, database files, database logs, logs, classification objects, and objects used in other classification projects.

7. The method of claim 1, wherein the tier of storage includes one or more of the following: a Tier-0 drive, PCI Flash drive, SSD drive, Tier-1 drive, FC drive, 15 k rpm Serial-Attached SCSI drive, 10 k rpm Serial-Attached SCSI drive, Tier-2 drives, Nearline Serial-Attached SCSI drive, SATA drive, Tier-3 drives, Tape drive, and a cloud storage.

8. The method of claim 1, wherein the data science technique uses data analytic software.

9. The method of claim 1, wherein the data science technique includes micro-text mining.

10. The method of claim 1, wherein the data science technique includes clustering using statistical fingerprinting.

11. The method of claim 10, wherein clustering using statistical fingerprinting comprises assigning an observation to the nearest statistically close cluster.

12. The method of claim 10, wherein statistical fingerprinting includes using one or more of the following: a Hamming weight, an arithmetic mean, a Shannon entropy, and a Kolmogrov-Smirnov p-value.

13. The method of claim 1, wherein adjusting the sample survey technique includes using a range iteration routine.

14. The method of claim 1, further comprising decrypting the sample data before using the data science technique.

15. The method of claim 1, further comprising adjusting the data science technique based at least in part on using a machine learning algorithm over a plurality of previous classifications.

16. A system, comprising:
a processor configured to:
unilaterally access a raw data from a storage device;
use a sample survey technique on the raw data to select a sample data;
use the sample survey technique on an updated raw data to select an updated sample data;
use a dynamic data science technique comprising a state change analysis on the sample data and the updated sample data to determine a sample data category;
classify the raw data at least in part by considering the sample data category;
iterate to adjust the sample survey technique based at least in part on the classification of a nearby sample data, wherein adjusting the sample survey technique includes increasing confidence and decreasing sample density of future sample surveys for a same LUN;
provide the classification to a tiering software associated with the storage device; and
adjust classification on future sample data categories for the same LUN; and
a memory coupled to the processor and configured to provide the processor with instructions.

17. A computer program product, the computer program product being embodied in a non-transitory machine-readable storage medium and comprising computer instructions for:
unilaterally accessing a raw data from a storage device;
using a sample survey technique on the raw data to select a sample data;
using the sample survey technique on an updated raw data to select an updated sample data;
using a dynamic data science technique comprising a state change analysis on the sample data and the updated sample data to determine a sample data category;
classifying the raw data at least in part by considering the sample data category;
iterating to adjust the sample survey technique based at least in part on the classification of a nearby sample data, wherein adjusting the sample survey technique includes increasing confidence and decreasing sample density of future sample surveys for a same LUN;
providing the classification to a tiering software associated with the storage device; and
adjusting classification on future sample data categories for the same LUN.

* * * * *